(No Model.)

J. E. EATON.
ARTIFICIAL BOARD.

No. 491,092.              Patented Feb. 7, 1893.

UNITED STATES PATENT OFFICE.

JAMES EMERY EATON, OF UTICA, NEW YORK.

ARTIFICIAL BOARD.

SPECIFICATION forming part of Letters Patent No. 491,092, dated February 7, 1893.

Application filed July 16, 1892. Serial No. 440,189. (No model.)

*To all whom it may concern:*

Be it known that I, JAMES EMERY EATON, of Utica, in the county of Oneida and State of New York, have invented certain new and useful Improvements in Artificial Boards; and I do hereby declare the following to be a full, clear, and exact description of the invention, such as will enable others skilled in the art to which it pertains to make and use the same.

My invention relates to an artificial board composed of several layers of straw-board or fibrous vegetable material united by cementation and under considerable pressure, the object being to produce a board more especially adapted for book bindings,—a board that is cheap and durable, and not liable to warp.

Figure 1:
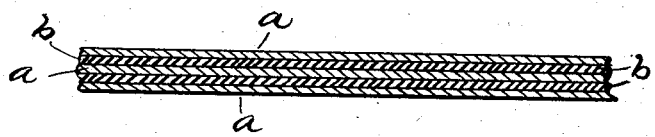
Figure 2:
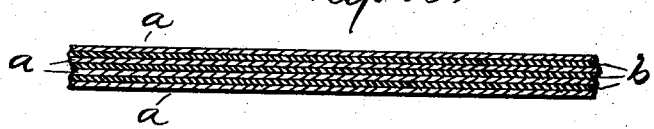

In the accompanying drawings, Figures 1 and 2 are transverse sections of artificial boards embodying my invention, the board shown in Fig. 1 being composed of five layers of material and that shown in Fig. 2, being composed of seven layers.

My improved artificial board is preferably composed of several layers of straw-board or fibrous vegetable material with two or more of the intermediate layers saturated with a hardening composition, such, for instance, as a composition of resin, pitch or tar, and linseed oil. A suitable hardening composition can be made by taking of pitch six pounds and of oil one gallon to every one hundred and ten or one hundred and fifteen pounds of resin and thoroughly mixing the same by agitation. A suitable hardening composition, by which I have obtained good results, can be had by taking of gelatine or glue twenty parts to one hundred parts of water, and of alum ten parts to one hundred parts of water; first, thoroughly saturating the sheets or layers of material with the gelatine size, and after drying, passing the sheets or layers through a bath of the alum solution. A layer of unsaturated material is interposed between the layers saturated with the hardening composition. Unsaturated material is also employed for the outer layers, so that paste, glue or cement will readily adhere thereto in covering the same with paper or cloth as for book-binding.

In Fig. 1 is shown a board composed of five layers, the central and outer layers, $a$, being unsaturated, while the intervening layers, $b$, are saturated with a hardening composition.

In Fig. 2 is shown a board composed of seven layers arranged as hereinbefore indicated,—namely, a layer $b$ saturated with a hardening composition being interposed between the layers $a$ of unsaturated material, and unsaturated material being employed for the outer layers.

The layers of material are united by cementation and when assembled as hereinbefore indicated, they are placed between two flat surfaces under considerable pressure, preferably about two hundred and fifty pounds per square inch, resulting in a firm and complete cementation of the layers of material and making a compact board that is exceedingly well adapted for book-binding, possessing lightness and durability; being cheap in its manufacture, and not liable to become warped.

What I claim is:—

As an article of manufacture, an artificial board composed of several layers, of straw-board or fibrous vegetable material, united together by cementation, two or more of said layers being saturated with a hardening composition, and an unsaturated layer being interposed between said hardened layers, and unsaturated material composing the outer layers, substantially as and for the purpose set forth.

In testimony whereof I sign this specification, in the presence of two witnesses, this 1st day of July, 1892.

J. EMERY EATON.

Witnesses:
ANNA E. JONES,
C. D. ADAMS.